United States Patent

McGowan

(10) Patent No.: US 9,115,835 B2
(45) Date of Patent: Aug. 25, 2015

(54) PLUG LOCK

(75) Inventor: Sean M. McGowan, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 788 days.

(21) Appl. No.: 13/352,728

(22) Filed: Jan. 18, 2012

(65) Prior Publication Data

US 2013/0180610 A1 Jul. 18, 2013

(51) Int. Cl.
*F16L 37/14* (2006.01)
*F16L 55/11* (2006.01)

(52) U.S. Cl.
CPC .............. *F16L 37/148* (2013.01); *F16L 55/11* (2013.01); *Y10T 137/87917* (2015.04)

(58) Field of Classification Search
USPC ...................... 285/84, 86, 307, 321
See application file for complete search history.

(56) References Cited

U.S. PATENT DOCUMENTS

| | | | | |
|---|---|---|---|---|
| 2,805,089 A * | 9/1957 | Hansen | | 285/317 |
| 2,869,099 A * | 1/1959 | Robinson | | 439/357 |
| 3,574,359 A * | 4/1971 | Klein | | 285/86 |
| 4,696,497 A * | 9/1987 | Schwarzensteiner | | 285/307 |
| 5,704,658 A * | 1/1998 | Tozaki et al. | | 285/305 |
| 5,749,606 A * | 5/1998 | Lu et al. | | 285/86 |
| 6,467,817 B1 * | 10/2002 | Rhyman | | 285/319 |
| 7,571,939 B2 * | 8/2009 | Yoshida et al. | | 285/321 |
| 7,661,725 B2 * | 2/2010 | Kouda | | 285/316 |
| 2009/0108580 A1 * | 4/2009 | Hoffman | | 285/277 |

* cited by examiner

*Primary Examiner* — James Hewitt
(74) *Attorney, Agent, or Firm* — Quinn Law Group, PLLC

(57) ABSTRACT

An apparatus includes a fitting having an inner surface defining a passageway, an outer surface, and at least one aperture extending from the outer surface to the inner surface. A plug extends into the passageway and has a plug surface defining at least one hole. A retaining member extends through the aperture and into the hole to retain the plug with respect to the fitting. A locking member is operatively connected to the fitting and the plug, and is positioned such that the locking member restricts movement of the retaining member out of said at least one hole.

17 Claims, 4 Drawing Sheets

PLUG LOCK

TECHNICAL FIELD

This invention relates to locking devices for fluid plugs.

BACKGROUND

Fluid couplings typically include fittings that define fluid passageways. Plugs may be employed to obstruct the fluid passageway during pressure testing of the couplings.

SUMMARY

An apparatus includes a fitting having an inner surface defining a passageway, an outer surface, and at least one aperture extending from the outer surface to the inner surface. A plug extends into the passageway and has a plug surface defining at least one hole. A retaining member extends through the aperture and into the hole to retain the plug with respect to the fitting. A locking member is operatively connected to the fitting and the plug, and is positioned such that the locking member restricts movement of the retaining member out of said at least one hole. The locking member thereby prevents unwanted disengagement of the plug from the fitting.

The above features and advantages and other features and advantages of the present invention are readily apparent from the following detailed description of the best modes for carrying out the invention when taken in connection with the accompanying drawings.

DETAILED DESCRIPTION

Figure 1:
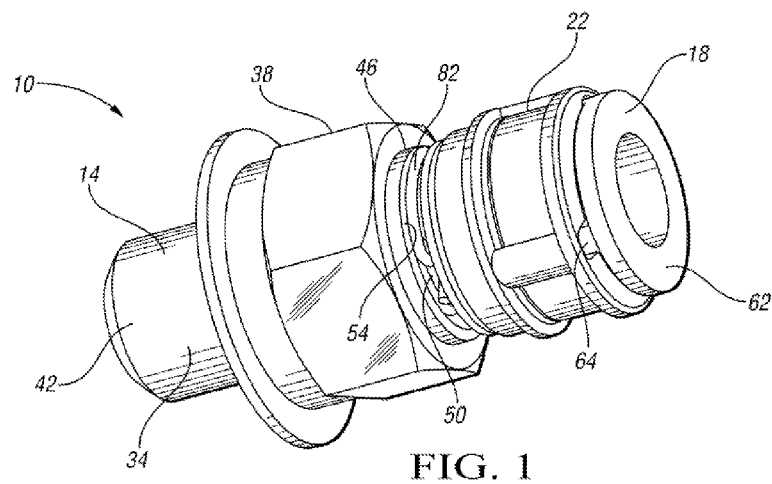
FIG. 1 is a schematic, perspective view of a fitting assembly including a fitting, a plug, a retaining member, and a locking member in a first position.
Figure 2:
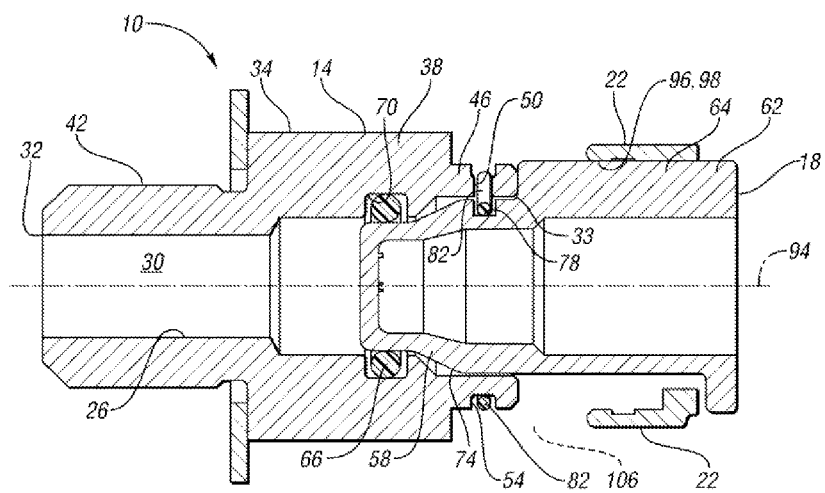
FIG. 2 is a schematic, sectional, side view of the fitting assembly of FIG. 1 with the locking member in the first position.

Referring to FIGS. 1 and 2, a fitting assembly 10 for a quick-connect fluid coupling is schematically depicted. The fitting assembly 10 includes a fitting 14, a plug 18, and a locking member 22. The fitting 14 has an inner surface 26 that defines a fluid passageway 30. The passageway 30 extends through the fitting 14 from a first opening 32 to a second opening 33. In the embodiment depicted, the inner surface 26 and the passageway 30 are generally cylindrical. The fitting 14 also has an outer surface 34. The outer surface 34 in the embodiment depicted includes a polygonal portion 38 that facilitates the application of torque to the fitting 14, and generally cylindrical portions 42, 46.

The fitting 14 defines at least one aperture 50 that extends from the outer surface 34 to the inner surface 26 such that the passageway 30 is accessible from the exterior of the fitting 14 via the aperture 50. In the embodiment depicted, the outer surface 34 is characterized by an annular groove 54; the aperture 50 extends from the groove 54 to the inner surface 26.

The plug 18 is configured to selectively obstruct the passageway 30. More specifically, the plug 18 is characterized by a narrow portion 58 that extends into the passageway 30 through the second opening 33. The plug 18 is also characterized by a wide portion 62 having protrusions 64 extending radially outward. The protrusions 64 cause the wide portion 62 to be wider than the opening 33, thereby preventing over-insertion of the plug 18 into the passageway 30. An annular seal 66 is at least partially disposed within a groove 70 formed in the inner surface 26. The narrow portion 58 of the plug 18 cooperates with the annular seal 66 to obstruct the passageway 30, as shown in FIG. 2.

Figure 3:
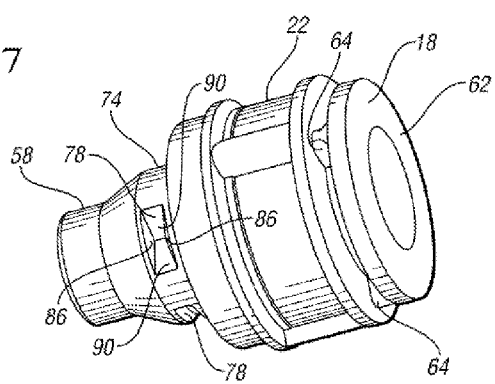
FIG. 3 is a schematic, perspective view of the plug and locking member of FIG. 1.

The outer surface 74 of the plug 18 defines at least one retaining hole 78 in the narrow portion 58. In the embodiment depicted, the hole 78 is a blind hole or notch. To retain the plug 18 inside the passageway 30 and thereby seal the passageway 30, each hole 78 is aligned with a respective aperture 50 in the fitting 14. The plug 18 is retained in the passageway 30 by a retaining member 82 that extends through at least one aperture 50 and into at least one hole 78. Referring to FIG. 3, wherein like reference numbers refer to like components from FIGS. 1 and 2, each hole 78 is partially formed by two walls 86, which are substantially perpendicular to the axial direction. Referring again to FIG. 2, the interaction between the retaining member 82 and the walls 86 of the hole 78 prevents axial movement of the plug 18 out of the passageway 30 when the retaining member 82 extends into a hole 78, as shown in FIG. 2. In the embodiment depicted, the retaining member 82 is a metallic wire that partially circumscribes the fitting 14 inside the groove 54.

Referring again to FIG. 3, the holes 78 are characterized by walls 90 that are positioned to contact the retaining member 82 when the plug 18 is rotated relative to the fitting 14. The walls 90 are sufficiently angled to exert a radially outward force on the retaining member 82 as the plug 18 is rotated relative to the fitting 14 about an axis (shown at 94 in FIG. 2), and the retaining member 82 is thereby elastically deformed and moves radially outward. When the plug 18 is sufficiently rotated, the retaining member 82 is no longer disposed within the hole 78, and thus the walls 86 do not prevent axial movement of the plug 18; accordingly, the plug 18 is removable from the passageway 30 by rotating the plug 18 relative to the fitting 14.

Figure 4:
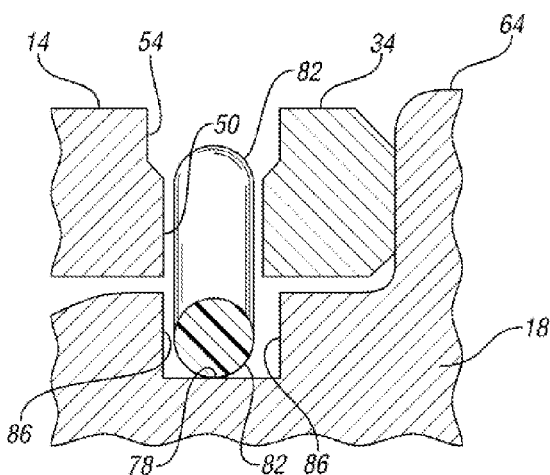
FIG. 4 is a schematic, sectional, side view of a portion of the fitting assembly of FIG. 1 with the retaining member engaged with the deepest part of a hole in the plug.
Figure 5:
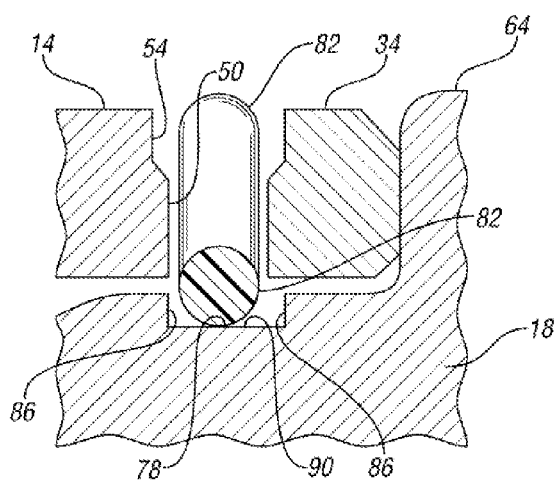
FIG. 5 is a schematic, sectional, side view of a portion of the fitting assembly of FIG. 1 with the plug rotated from its position in FIG. 4.
Figure 6:
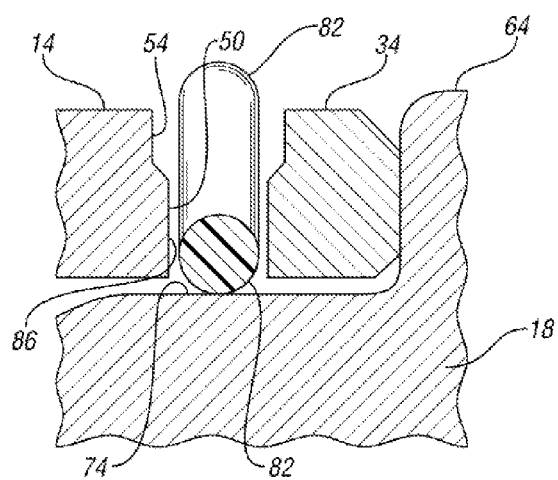
FIG. 6 is a schematic, sectional, side view of a portion of the fitting assembly of FIG. 1 with the plug rotated from its position in FIGS. 4 and 5 such that the retaining member is outside the hole.

FIG. 4 schematically depicts the retaining member 82 extending from the groove 54, through the aperture 50, and into the deepest portion of the hole 78. Referring to FIG. 4, when the retaining member 82 contacts the plug 18 at the deepest portion of the hole 78, walls 86 prevent or restrict axial movement of the plug 18 with respect to the fitting 14. The retaining member 82 does not protrude radially outward out of the groove 54. Referring to FIG. 5, as the plug 18 is rotated, wall 90 urges the retaining member 82 to move radially outward. Referring to FIG. 6, continued rotation of the plug 18 relative to the fitting 14 causes the hole 78 in the plug 18 to no longer be aligned with the aperture 50 in the fitting 14.

Figure 7:
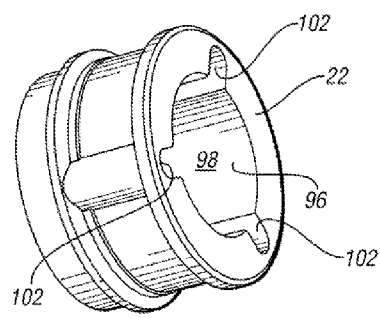
FIG. 7 is a schematic, perspective view of the locking member of FIG. 1.

Referring to FIGS. 3 and 7, the locking member 22 includes an inner surface 96 that defines an opening 98 through which the plug 18 extends. The inner surface 96 in the embodiment depicted is primarily cylindrical, but is characterized by grooves or slots 102 to accommodate the protrusions 64 on the wide portion 62 of the plug 18. That is, the slots 102 are positioned such that each of the protrusions 64 is disposed within a respective one of the slots 102.

Figure 8:
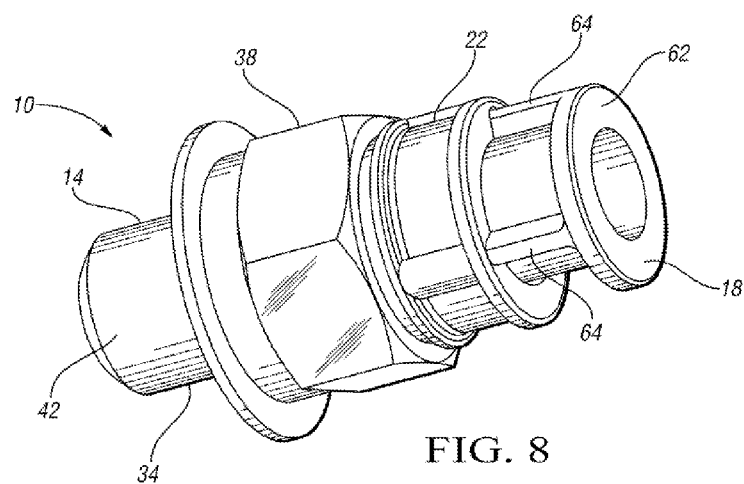
FIG. 8 is a schematic, perspective view of the fitting assembly of FIG. 1 with the locking member in a second position.
Figure 9:
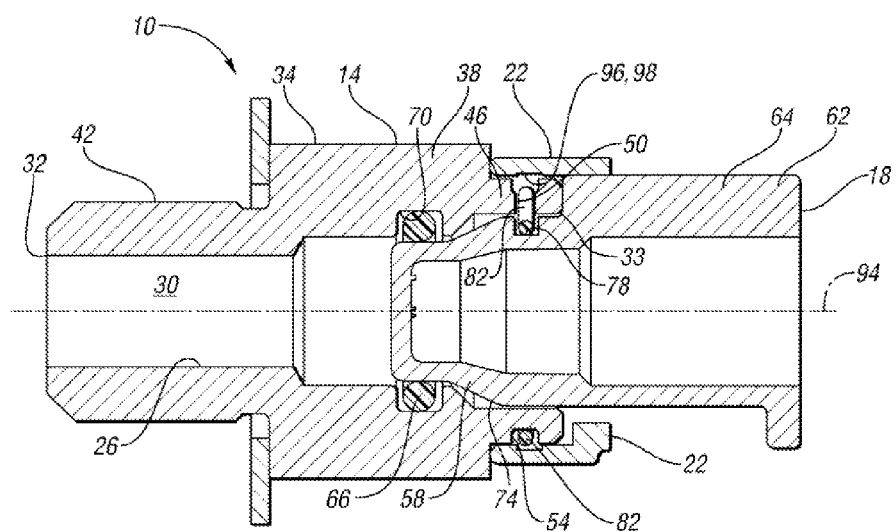
FIG. 9 is a schematic, sectional, side view of the fitting assembly of FIG. 8 with the locking member in the second position.

The locking member 22 is configured to selectively prevent rotation of the plug 18 with respect to the fitting 14, and thereby selectively prevent removal of the plug 18 from its sealing position against the seal 66 inside the passageway 30. More specifically, the locking member 22 is selectively movable with respect to the plug 18 and the fitting 14 between a first position, as shown in FIGS. 1 and 2, and a second position, as shown in FIGS. 8 and 9. In the embodiment depicted, the locking member 22 is selectively, axially translatable along the plug 18 between the first and second positions.

Referring to FIGS. 1 and 2, when the locking member 22 is in the first position, the locking member does not restrict movement of the retaining member 82 out of the hole 78. More specifically, the locking member 22 in the first position does not interfere with radial movement of the retaining member 82, and thus the retaining member 82 is free to move from the position shown in FIG. 4 to the position shown in FIG. 6. Accordingly, when the locking member 22 is in the first position, the plug 18 is free to rotate about the axis 94 and move axially out of engagement with the seal 66.

Referring to FIGS. 8 and 9, when the locking member 22 is in the second position, the inner surface 96 of the locking member 22 circumscribes the groove 54 and the retaining member 82 disposed therein, thereby limiting or preventing radial movement of the retaining member 82 out of the hole 78. Accordingly, when the locking member 22 is in the second position, the locking member 22 ensures that the plug 18 maintains engagement with the seal 66. More specifically, when the retaining member 82 is within the hole 78, the interaction between the retaining member 82 and the walls 86 prevents axial movement of the plug 18 relative to the fitting 14, and thus contact between the seal 66 and the plug 18 is maintained. The locking member 22 in the second position ensures that the retaining member 82 remains within the hole 78.

While the best modes for carrying out the invention have been described in detail, those familiar with the art to which this invention relates will recognize various alternative designs and embodiments for practicing the invention within the scope of the appended claims.

The invention claimed is:

1. An apparatus comprising:
a fitting having an inner surface defining a passageway, an outer surface, and at least one aperture extending from the outer surface to the inner surface;
a plug extending into the passageway and having a plug outer surface defining at least one hole; wherein the plug is configured to selectively obstruct the passageway;
a retaining member extending through the at least one aperture and into the at least one hole to retain the plug with respect to the fitting, with a portion of the retaining member engaging the outer surface of the fitting; and
a locking member being operatively connected to the fitting and the plug and positioned such that the locking member restricts movement of the retaining member out of the at least one hole when the locking member is in a predetermined position;
wherein the plug includes a first wall that at least partially defines the at least one hole, with the first wall angled such that the retaining member moves along the angled first wall out of the at least one hole and into engagement with the plug outer surface adjacent to the at least one hole when the plug is rotated in a predetermined direction.

2. The apparatus of claim 1, wherein the outer surface of the fitting defines a groove to present a bottom and a pair of side walls; and wherein the retaining member is at least partially disposed within the groove to engage the bottom between the side walls.

3. The apparatus of claim 1, wherein the plug includes a second wall that cooperates with the first wall to at least partially define the at least one hole;
wherein the plug is selectively moveable in a direction out of the passageway; and
wherein the second wall is substantially perpendicular to the direction.

4. The apparatus of claim 1, wherein the retaining member is disposed in the aperture such that the retaining member is recessed below the outer surface of the fitting when the retaining member is disposed in the at least one hole to allow the sleeve to cover the retaining member.

5. The apparatus of claim 1, wherein the retaining member moves outwardly through the aperture such that at least a portion of the retaining member is exposed above the outer surface of the fitting when the retaining member moves along the angled first wall out of the at least one hole and into engagement with the plug outer surface adjacent to the at least one hole when the plug is rotated in the predetermined direction such that the sleeve is prevented from covering the retaining member.

6. The apparatus of claim 1, wherein the plug includes a wide portion having protrusions extending radially outward and the protrusions have an end face that engages the fitting to prevent over-insertion of the plug into the passageway.

7. The apparatus of claim 6, wherein the locking member includes an inner surface that defines an opening that receives the plug, with the inner surface of the locking member defining slots to receive respective protrusions of the wide portion of the plug.

8. The apparatus of claim 1, wherein the locking member is selectively translatable axially along the plug.

9. An apparatus comprising:
a fitting having a first inner surface defining a passageway, an outer surface, and at least one aperture extending from the outer surface to the first inner surface;
a plug extending into the passageway and having a plug outer surface defining at least one hole; wherein the plug is configured to selectively obstruct the passageway;
a retaining member extending through the at least one aperture and into the at least one hole to retain the plug with respect to the fitting, with a portion of the retaining member engaging the outer surface of the fitting; and
a locking member being operatively connected to the plug and being selectively movable with respect to the plug between a first position and a second position;
wherein the locking member in the first position does not restrict movement of the retaining member out of the at least one hole;
wherein the locking member in the second position restricts movement of the retaining member out of the at least one hole;

wherein the plug includes a first wall that at least partially defines the at least one hole, with the first wall angled such that the retaining member moves along the angled first wall out of the at least one hole and into engagement with the plug outer surface adjacent to the at least one hole when the plug is rotated in a predetermined direction.

10. The apparatus of claim 9, wherein the outer surface of the fitting defines an annular groove to present a bottom and a pair of side walls; and wherein the retaining member is at least partially disposed within the annular groove to engage the bottom between the side walls.

11. The apparatus of claim 10, wherein the locking member circumscribes the annular groove when the locking member is in the second position.

12. The apparatus of claim 11, wherein the locking member includes a second inner surface that defines an opening; and wherein the plug extends through the opening.

13. The apparatus of claim 12, wherein the locking member is selectively translatable axially along the plug between the first and second positions.

14. The apparatus of claim 9, wherein the retaining member is disposed in the aperture such that the retaining member is recessed below the outer surface of the fitting when the retaining member is disposed in the at least one hole to allow the sleeve to move to the second position to cover the retaining member.

15. The apparatus of claim 9, wherein the sleeve is movable to the first position such that the retaining member is movable outwardly through the aperture such that at least a portion of the retaining member is exposed above the outer surface of the fitting when the retaining member moves along the angled first wall out of the at least one hole and into engagement with the plug outer surface adjacent to the at least one hole when the plug is rotated in the predetermined direction such that the sleeve is prevented from covering the retaining member.

16. The apparatus of claim 9, wherein the plug includes a wide portion having protrusions extending radially outward and the protrusions have an end face that engages the fitting to prevent over-insertion of the plug into the passageway.

17. The apparatus of claim 16, wherein the locking member includes a second inner surface that defines an opening that receives the plug, with the second inner surface defining slots to receive respective protrusions of the wide portion of the plug.

* * * * *